US011747445B2

(12) United States Patent
Keller et al.

(10) Patent No.: US 11,747,445 B2
(45) Date of Patent: Sep. 5, 2023

(54) WARNING RECEIVER FOR DETECTING AND CHARACTERIZING AN OPTICAL SOURCE

(71) Applicant: Raytheon Company, Waltham, MA (US)

(72) Inventors: Sean D. Keller, Tucson, AZ (US); Gerald P. Uyeno, Tucson, AZ (US); Zachary D. Barker, Beavercreek, OH (US)

(73) Assignee: Raytheon Company, Waltham, MA (US)

( * ) Notice: Subject to any disclaimer, the term of this patent is extended or adjusted under 35 U.S.C. 154(b) by 35 days.

(21) Appl. No.: 17/411,859

(22) Filed: Aug. 25, 2021

(65) Prior Publication Data

US 2023/0068495 A1 Mar. 2, 2023

(51) Int. Cl.
*G01S 7/48* (2006.01)
*G01S 3/781* (2006.01)
*G01S 3/787* (2006.01)
*G02B 13/08* (2006.01)

(52) U.S. Cl.
CPC ............ *G01S 7/4804* (2013.01); *G01S 3/781* (2013.01); *G01S 3/787* (2013.01); *G02B 13/08* (2013.01)

(58) Field of Classification Search
CPC ........ G01S 7/4804; G01S 3/781; G01S 3/787; G01S 7/4816; G02B 13/08
USPC ....................................................... 250/216
See application file for complete search history.

(56) References Cited

U.S. PATENT DOCUMENTS

| 7,253,895 | B2 * | 8/2007 | Kauffman | G01J 3/2823 356/73 |
|---|---|---|---|---|
| 7,456,940 | B2 * | 11/2008 | Crow | G01J 3/0294 356/73 |
| 8,917,390 | B2 * | 12/2014 | Behr | G01J 3/0205 356/326 |
| 10,739,454 | B2 | 8/2020 | Choiniere et al. | |
| 2006/0082772 | A1 | 4/2006 | Kehoe et al. | |

(Continued)

OTHER PUBLICATIONS

Chen, Wei Ting, et al., "Flat optics with dispersion-engineered metasurfaces", Nature Reviews Materials 5, (Jun. 19, 2020), 604-620.

(Continued)

*Primary Examiner* — Que Tan Le
*Assistant Examiner* — Mai Thi Ngoc Tran
(74) *Attorney, Agent, or Firm* — Schwegman Lundberg & Woessner, P.A.

(57) ABSTRACT

A warning receiver includes an anamorphic lens positioned to receive light within a field-of-view (FOV) defined by first and second angles that are orthogonal to each other and compress the light along the first orthogonal angle into a single line along the second orthogonal angle. A dispersive element is positioned to separate the single line of light into a plurality of wavelengths to produce a two-dimensional light field indexed by the second orthogonal angle and wavelength. A pixelated detector is positioned to receive the light field and readout electrical signals indexed by the second orthogonal angle and wavelength. A processor coupled to the pixelated detector process the electrical signals to detect and characterize an optical source within the FOV.

23 Claims, 12 Drawing Sheets

(56) References Cited

U.S. PATENT DOCUMENTS

2014/0300973 A1* 10/2014 Neil ................. G02B 13/08
359/671
2019/0094362 A1 3/2019 Choiniere et al.
2021/0080403 A1* 3/2021 Yoshida ............. G01J 3/0208

OTHER PUBLICATIONS

Mei, Jin, "Laser Warning Receiver", National Air Intelligence Center (English Translation), (Aug. 20, 1996), 24 pgs.
U.S. Appl. No. 17/961,185, filed Oct. 6, 2022, Quick-Mount Laser Warning Receiver.
"International Application Serial No. PCT/US2022/041372, International Search Report dated Dec. 8, 2022", 5 pgs.
"International Application Serial No. PCT/US2022/041372, Written Opinion dated Dec. 8, 2022", 9 pgs.
"Part 1 Indentification and Significance of the Problem", [Online]. Retrieved from the Internet: <URL:https://web.archive.org/web/20081104075342/http://www.eagleshore.com/rsc/lwr.htm>, (Nov. 4, 2008), 3-5 pgs.

* cited by examiner

WARNING RECEIVER FOR DETECTING AND CHARACTERIZING AN OPTICAL SOURCE

FIELD OF THE INVENTION

This invention relates to warning receivers for detecting and characterizing optical sources including such laser sources as a Track Illuminator Laser (TIL), Beacon Illumination Laser (BIL) or High Energy Laser (HEL).

DESCRIPTION OF THE RELATED ART

"In the last 20 years, the applications of lasers in military affairs have grown wider by the day. Laser range finding causes the first round hit probability for guns to very, very greatly increase. Laser guidance then increases in an extremely large way weapon launch precisions and hit probabilities. Cost benefit ratios are very high. The combat power of U.S. military forces has already improved an order of magnitude relying on these small energy laser systems.

How should fire control systems having laser range finding and laser guided weapons systems be handled? This simply requires timely discovery of the laser operations of the hostile side. Laser warning receivers are the basic materiel for implementing laser countermeasures. Their role is to detect in a timely and accurate manner enemy laser range finders, laser radiation emitted from such things as target indicators, laser beam guidance illumination devices, and so on, to send out warnings, and to make notification of certain types of weapons of a threatening nature for example, artillery shells, bombs, or missiles having a possibility of coming in immediately, in order to facilitate the adoption in a timely manner of friendly emergency measures, or evasion, or the laying of smoke screen aerosols to protect themselves, or to notify associated weapons systems for example, guns or laser blinding weapons, and so forth to implement countermeasures. As a result, laser warning receivers are very significant with regard to effectively protecting oneself and destroying the enemy on the battlefield." National Air Intelligence Center Wright-Patterson AFB OH "Laser Warning Receiver" Aug. 20, 1996.

U.S. Pat. No. 7,456,940 B2 entitled "Methods and Apparatus for Locating and Classifying Optical Radiation" discloses a pair of orthogonally related imaging spectrometers to simultaneously create two diffraction profiles for each imaged optical source. Such orientation increases the accuracy of detecting diffraction profiles of interest ("DPI"), as a DPI will not be declared unless it is sensed by both spectrometers. As shown in FIG. 1 of U.S. Pat. No. 7,456,940, each spectrometer includes a grating 106, a lens 108 and a detector array 110. Grating 106 diffracts incoming radiation 116, thereby separating it into its constituent spectra. These rays (i.e., the $0^{th}$ order ray and the diffracted rays) are diffracted from grating 106 through lens 108, which focuses the rays to a diffraction profile (DP) on detector 110. As shown in FIG. 2 of that patent, the segments of each DP are aligned. The $0^{th}$ order ray segments 204a of DP 202a are approximately centrally located between diffracted ray segments 206a of DP 202a. The resulting DPs are processed to determine whether they were created by an optical source of interest.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides methods and apparatus for detecting and characterizing an optical source. The optical source may, for example, comprise a laser source such as a rangefinder, designator, Track Illuminator Laser (TIL), Beacon Illumination Laser (BIL) or High Energy Laser (HEL). The methods and apparatus may be particularly configured to detect and characterize specific laser lines over a solar background.

A warning receiver includes an anamorphic lens positioned to receive light within a field-of-view (FOV) defined by first and second angles that are orthogonal to each other and compress the light along the first orthogonal angle into a single line along the second orthogonal angle. A dispersive element is positioned to separate the single line of light into a plurality of wavelengths to produce a two-dimensional light field indexed by the second orthogonal angle and wavelength. A pixelated detector is positioned to receive the light field and readout electrical signals indexed by the second orthogonal angle and wavelength. A processor coupled to the pixelated detector process the electrical signals to detect and characterize an optical source within the FOV.

The anamorphic lens may be a cylindrical lens or a cylindrical lens formed with an asphere, which is commonly known as a Powell lens. The Powell lens provides improved uniformity of the compressed light along the second orthogonal angle.

The dispersive element may be a refractive element such as a prism, an engineered diffractive surfaces such as with metamaterials, a $0^{th}$-order diffraction grating or an Nth-order diffraction grating in which only the spectral components around the $0^{th}$ order is detected and processed with the higher orders treated as stray light. A mechanical element such as a filter wheel may rotate multiple dispersive elements in and out of the optical path to vary the wavelength separation of the single line.

The processor may be configured to estimate a solar background, by calculation or detected irradiance, detect one or more spectral components against the solar background and characterize the optical source.

The processor may locate the detected optical source in the second orthogonal angle. For example, using a conventional Az (Azimuth) and El (Elevation) angular coordinate system. If the anamorphic lens compresses the light in Elevation, the processor can locate the source in Az. In certain systems, being able to locate the optical source in only Az is sufficient to pass off tracking of the source and any further response to a different system.

In order to locate the source in both Az and El, the warning receiver can mount the anamorphic lens and dispersive element on a platform and rotate the platform about the optical axis of the anamorphic lens (perpendicular to Az and El angles). The processor will process the electrical signals at at least the orthogonal angles to alternately characterize and locate the source in Az and El and possibly at multiple angles to increase angular diversity. In another configuration, the warning receiver can have first and second orthogonal channels in which the anamorphic lenses and dispersive elements are positioned orthogonally to each other.

In one configuration, an aperture stop and the first dispersive element are positioned at or near a focal point of the anamorphic lens. In a different configuration, a second anamorphic lens is spaced at the combined focal lengths from the first anamorphic lens to define a telescope to improve the behavior of the light rays. The aperture stop is positioned between the anamorphic lens. In either configuration, the aperture stop may be variable to vary the FOV and the thickness of the single line (to exclude off-axis components) to maintain separation of the spectral components.

These and other features and advantages of the invention will be apparent to those skilled in the art from the following detailed description of preferred embodiments, taken together with the accompanying drawings, in which:

DETAILED DESCRIPTION OF THE INVENTION

The present invention provides methods and apparatus for detecting and characterizing an optical source. The optical source may, for example, comprise a laser source such as a rangefinder, designator, Track Illuminator Laser (TIL), Beacon Illumination Laser (BIL) or High Energy Laser (HEL). The methods and apparatus may be particularly configured to detect and characterize specific laser lines over a solar background.

Figure 1:
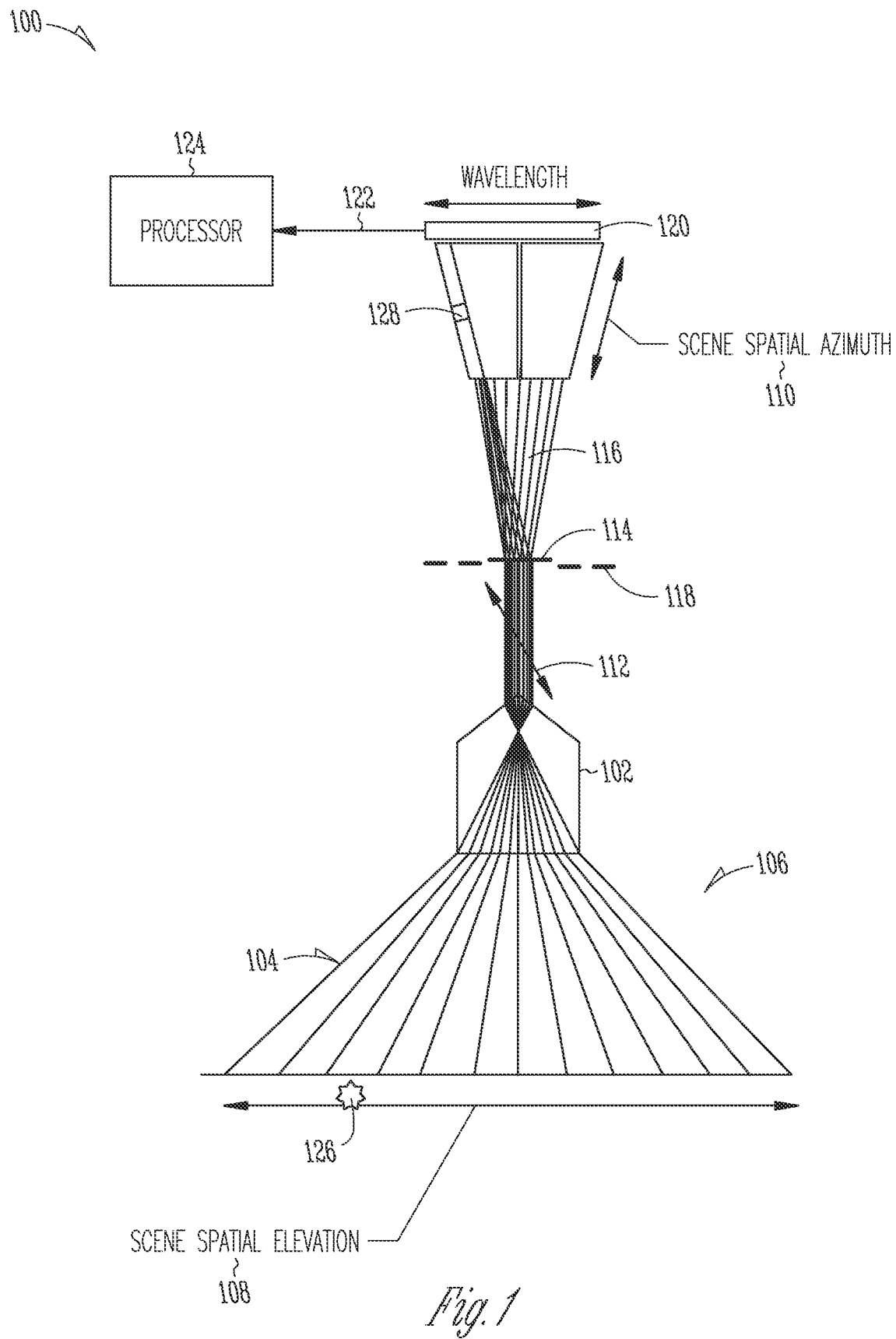
FIG. 1 is an optical block diagram of a warning system in which an anamorphic lens compresses light into a single line along a second angle and a dispersive element separates the line into a plurality of wavelengths to produce a light field indexed by the second angle and wavelength.

Referring now to FIG. 1, a warning receiver 100 includes an anamorphic lens 102 positioned to receive broad spectrum light 104 within a field-of-view (FOV) 106 defined by first and second angles 108 and 110, respectively, that are orthogonal to each other (e.g., scene spatial Elevation (El) and Azimuth (Az) and compress the light along the first angle into a single line 112 along the second angle. A dispersive element 114 is positioned to separate the single line 112 into a plurality of wavelengths to produce a two-dimensional light field 116 indexed by the second angle and wavelength.

The system's aperture stop 118 and the first dispersive element 114 are suitably positioned at or near the focal point of the anamorphic lens 102 to simplify the processing. The aperture stop 118 controls the extent of FOV 106. The aperture stop 118 may be fixed or variable. There is a trade-off between the FOV 106 and the thickness of single line 112. The wider the FOV, the thicker the line. A thinner line provides better spectral resolution. The aperture stop 118 may be used to reject off-axis rays thereby thinning the line and improving spectral resolution. The aperture stop may be formed with dispersive element 114 or as a separate mechanical element such as a slit.

A pixelated detector 120 (e.g. a focal plane array (FPA)) is positioned to receive the two-dimensional light field 116 and readout electrical signals 122 indexed by the second angle and wavelength. A processor 124 is coupled to the pixelated detector to process the electrical signals to detect and characterize an optical source 126 within the FOV and to locate 128 the optical source in scene spatial Az.

Figure 2B:
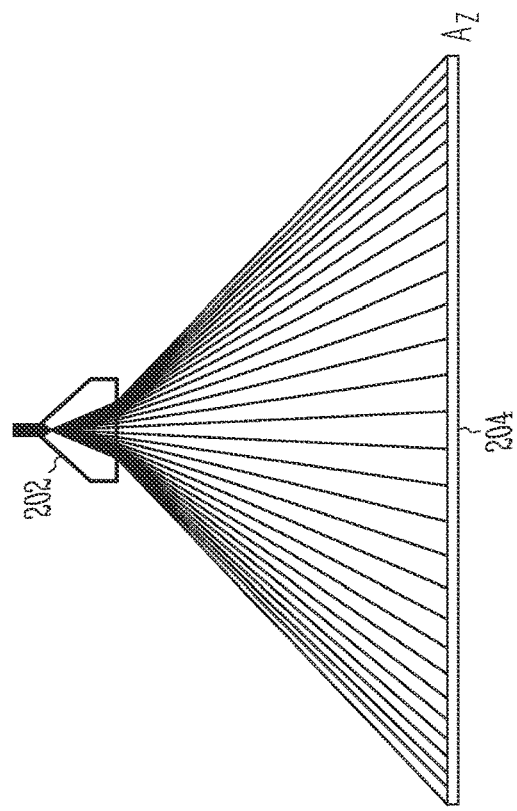
FIGS. 2A and 2B are illustrations of cylindrical and Powell lenses, respectively.
Figure 2A:
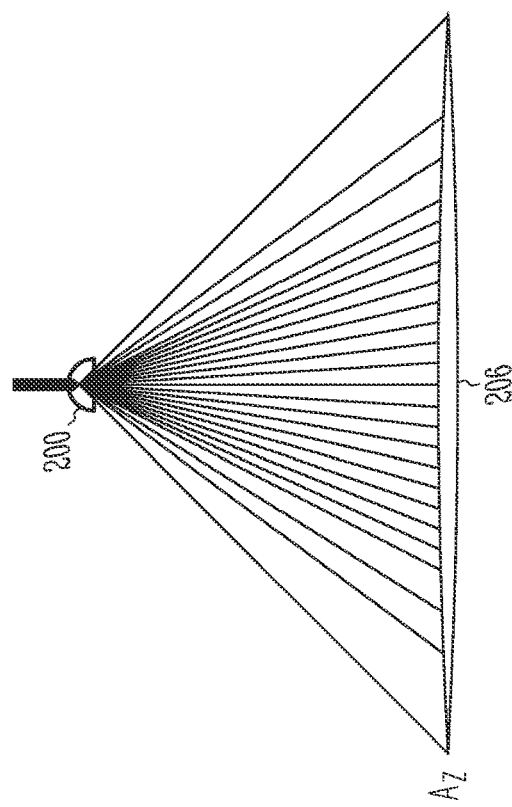

Referring now to FIGS. 2A and 2B, the anamorphic lens, which may also be referred to as a line generating lens, may be implemented as a cylindrical lens 200 or a Powell lens 202, which is a cylindrical lens with an asphere formed therein. As shown herein, both lenses compress light along the El angle to form a single line of light along the Az angle. The advantage of the Powell lens is that the distribution of light 204 along the Az angle is more uniform than the distribution of light 206 along the Az angle for the cylindrical lens.

Generally speaking, the dispersive element may be any optical element that separates the single line of light into a plurality of wavelengths to produce a two-dimensional light field index by the angle along that line and wavelength. The dispersive element may be configured to spread light in different spectral bands, vary the amount of spreading of the light, to maintain or reverse the order of the wavelengths, etc.

Figure 3A:
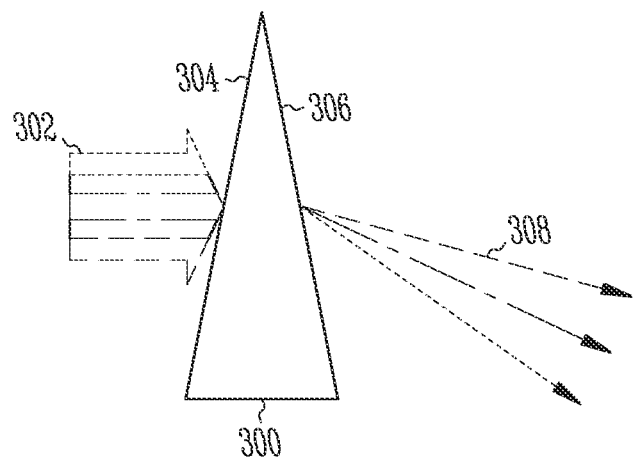
FIGS. 3A-3D are illustrations of different embodiment of a dispersive element including a refractive prism, an engineered diffractive element, a $0^{th}$-order diffractive grating and an Nth-order diffractive grating in which only the 0th-order mode is detected.

As shown in FIG. 3A, the dispersive element is a refractive element in the form of a prism 300. Broad spectrum light 302 incident on an input surface 304 of prism 300 exits the prism at output surface 306. The light changes direction according to Snell's law at the air-glass interfaces. The refractive index of glass varies with the wavelength of light. Thus different wavelengths 308 (spectral components) are refracted at different angles, hence spatially separated on the detector according to wavelength.

Figure 3B:
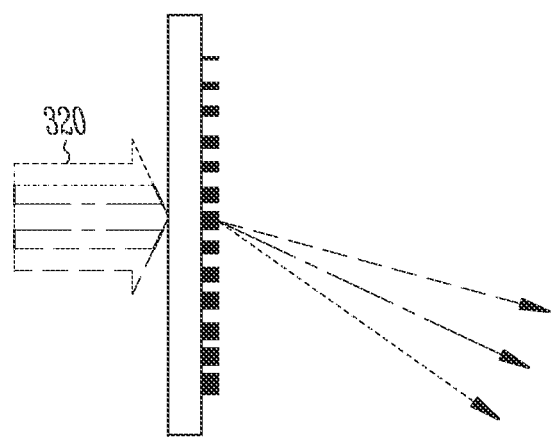

As shown in FIG. 3B, the dispersive element is an engineered diffractive surface 320. One example of an engineered diffractive surface is an electromagnetic metasurface, which is a kind of artificial sheet material. Metasurfaces can be either structured or unstructured with sub-wavelength-scaled patterns. The metasurfaces modulate behaviors of the optical waves through specific boundary conditions. The metasurface may be configured to control a wavefront by imparting local, gradient phase shifts to the incoming waves, which leads to a generalization of the laws of reflection and refraction. One specific application being to configure the metasurface to separate light according to wavelength. See Wei Ting Chen et. al., "Flat Optics with Dispersion-Engineered Metasurfaces," Nature Reviews|Materials, 2020.

Figure 3C:
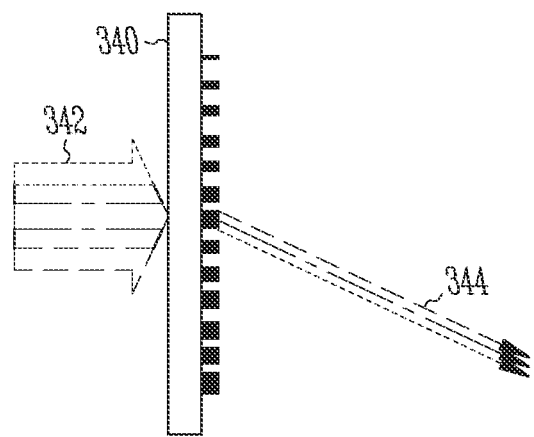

As shown in FIG. 3C, the dispersive element is a $0^{th}$-order diffraction grating 340 that separates broad spectrum light 342 into spectral components 344 around the $0^{th}$ order.

Figure 3D:
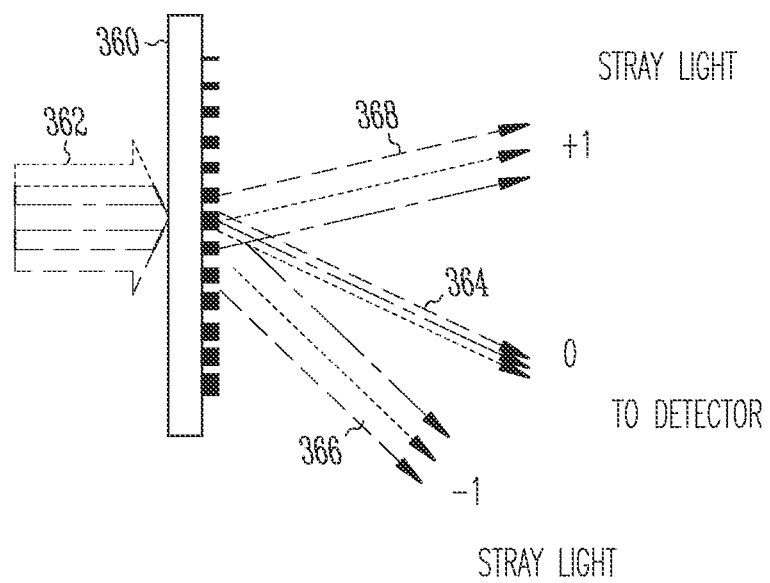

As shown in FIG. 3D, the dispersive element is an $N^{th}$-order diffraction grating 360. This example shows N=1. The grating 360 separates broad spectrum light 362 into a $0^{th}$-order component 364 and a +1 order component 366 and a −1 order component 368. The spectral components around the $0^{th}$-order component 364 are directed to the detector while the +/−1 components are treated as stray light.

The warning receiver illustrated in FIG. 1 is limited to detecting, characterizing and locating the optical source in a single angular dimension e.g., Az. Providing additional angular diversity increases the spectral information available to both characterize and locate the optical source.

Figure 4:
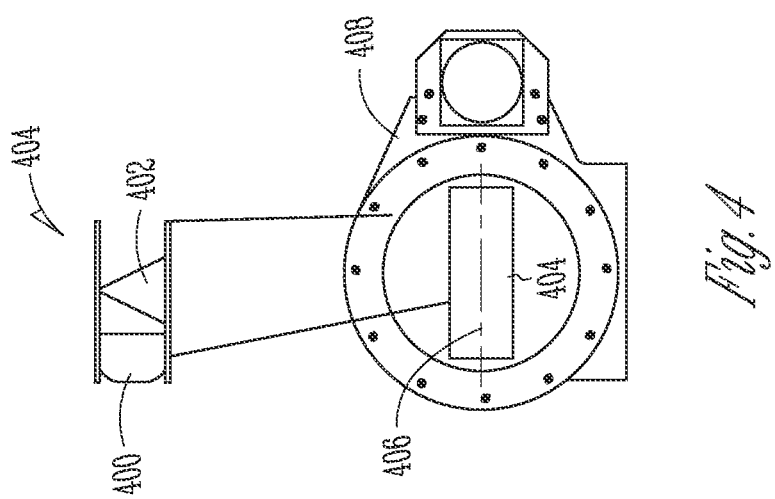
FIG. 4 is an embodiment of a warning system in which the anamorphic lens and dispersive element are rotated to achieve angular diversity.
Figure 6:
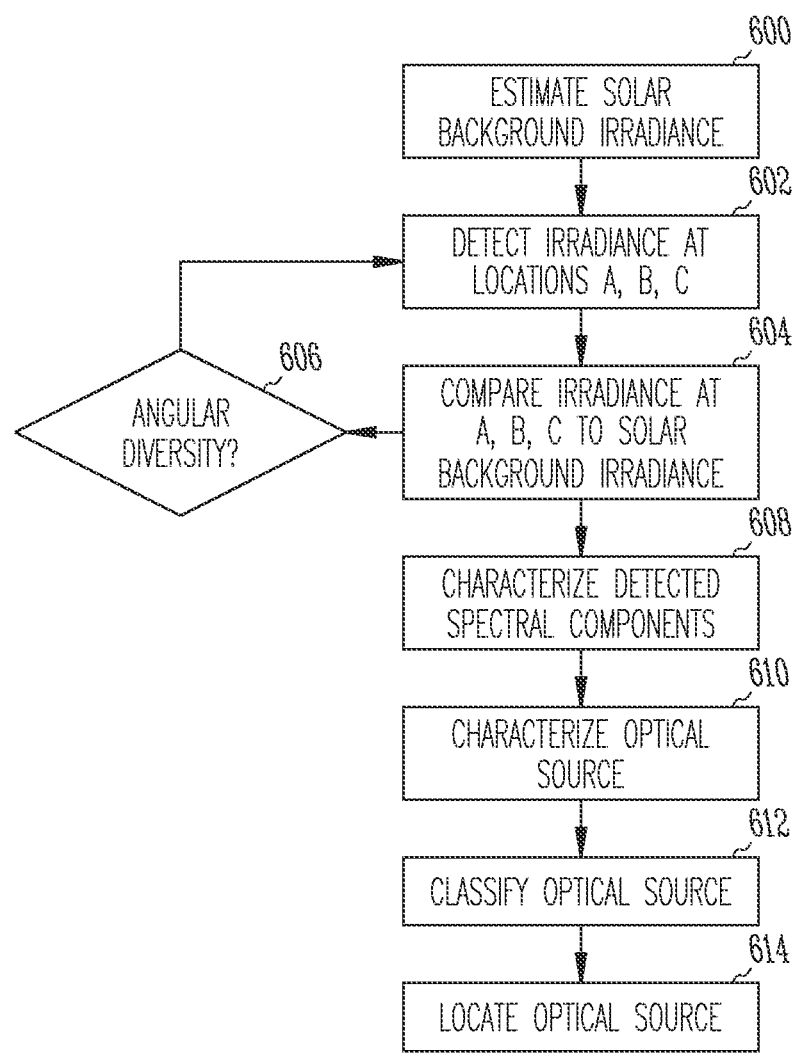
FIG. 6 is a flow diagram of an embodiment for processing the irradiance of the 2-D light field to detect and characterize an optical source.

Referring now to FIG. 4, an anamorphic lens 400 and a dispersive element 402 are positioned in a barrel 404 (more generally a platform) that rotates about an optical axis 406 (perpendicular to Az/El) via a rotation stage 408 to rotate the compressed angle around the optical axis. The processor processes the electrical signals to characterize the optical source and locate the optical source in both the first and second angles. The processor may be configured to only process the electrical signals in which the light field is indexed by only Az or El. Alternately, the processor may be configured to process all of the electrical signals including those in which the index is some function of both Az and El.

Figure 5:
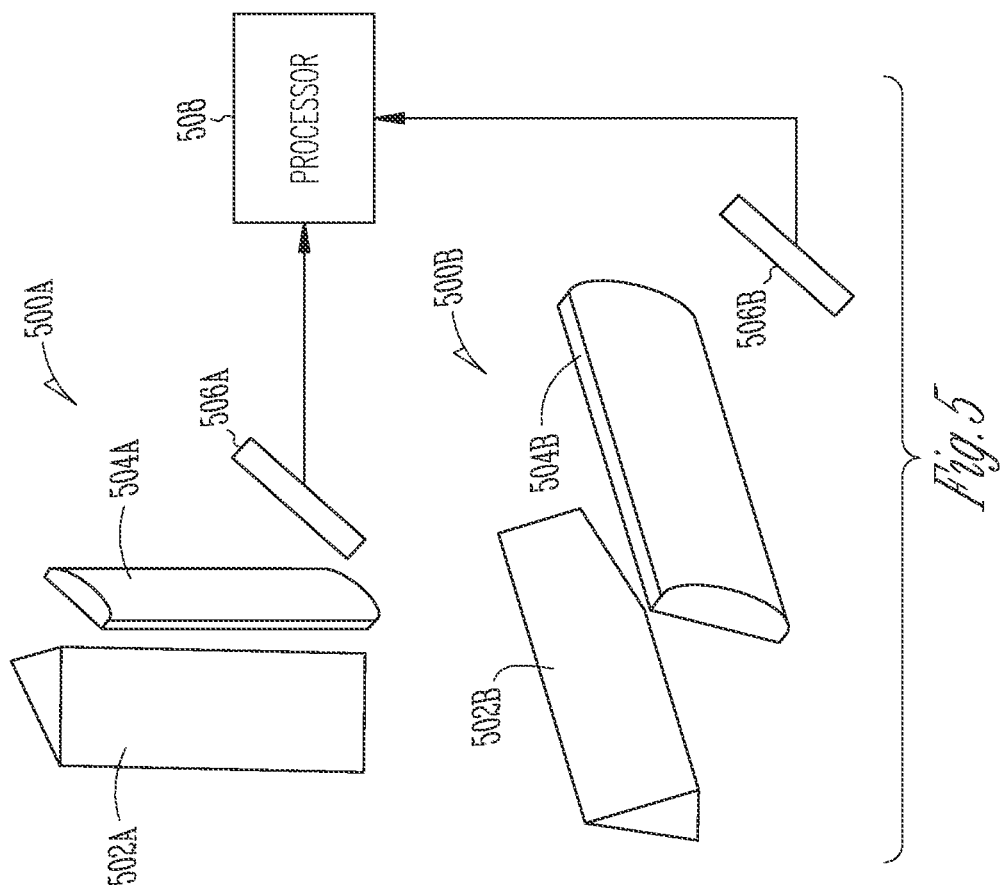
FIG. 5 is an embodiment of a warning system including two orthogonal channels.

Referring now to FIG. 5, a warning receiver may include first and second orthogonally oriented channels 500A and 500B, respectively. As previously described, each channel includes an anamorphic lens (502A, 502B), a dispersive element (504A, 504B) and a detector (506A, 506B). The channels would typically share a processor 508. The anamorphic lens/dispersive element in one channel is rotated orthogonally relative to the anamorphic lens/dispersive element in the other channel. As a result, one channel produces a light field index in Az and wavelength and the other channel produces a light field indexed in El and wavelength. The shared processor receives and processes the electrical signals from both detectors to characterize the optical source and to locate the optical source in Az, El.

Referring now to FIGS. 6, 7A-B, 8A-B, 9A-B, 10A-B and 11A-B, to detect, characterize and locate an optical source, the processor estimates a solar background irradiance as a function of wavelength (step 600). This can be done by measuring the irradiance in the FOV to generate the 2-D light field or by calculating the solar background irradiance based on a multitude of factors including GPS coordinates, altitude, time of day, temperature etc. The processor detects irradiance at locations A, B, C (e.g. different angular ranges in Az) (step 602) and compares the detected irradiance to the solar background irradiance (step 604) to detect any material deviations e.g. a spike above the background or a level below the background to identify possible spectral components of an optical source. If detected irradiance exists for other angles (step 606) e.g. rotating the anamorphic lens/dispersive element or a second orthogonal channel, the processor repeats steps 602 and 604 to identify other possible spectral components. The processor characterizes the spectral components e.g. the wavelength, amplitude (or delta amplitude above or below the solar background) (step 608). The processor may require that a spectral component must be identified in both Az and El to be accepted (assuming both are available).

Given all the available spectral information, the processor will then characterize the optical source (step 610). This may include one or more wavelengths, absolute or relative amplitude at the one or more wavelengths, and CW or pulsed. The processor may output the characterization of the optical source or may take the next step and use the characterization to classify the optical source as, for example, rangefinder, designator, BIL, TIL or HEL (step 612). The processor may also locate the optical source in Az and El (if available). In certain ground based applications, identifying the optical source and an Az angle is sufficient to hand off to another system to track and engage the source. The "location" of the optical source may be the actual location of the source if it is pointed directly at the warning system or it may be location of the source where it is scattered towards the warning receiver if the optical source is pointed elsewhere.

Figure 7A:
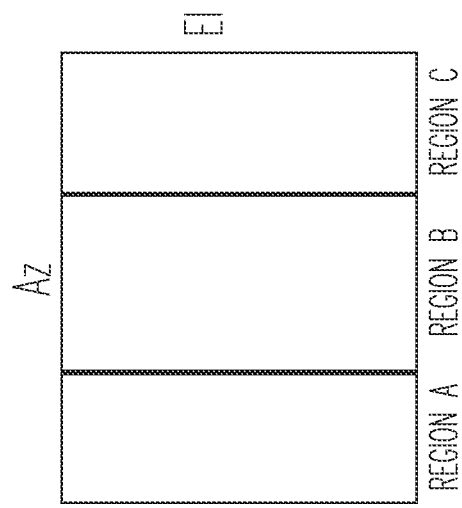
FIGS. 7A-7B, 8A-8B, 9A-9B, 10A-10B and 11A-11B are diagrams of regions of the scene and the irradiance of the 2-D light field of the scene index by wavelength and one of the angles.
Figure 7B:
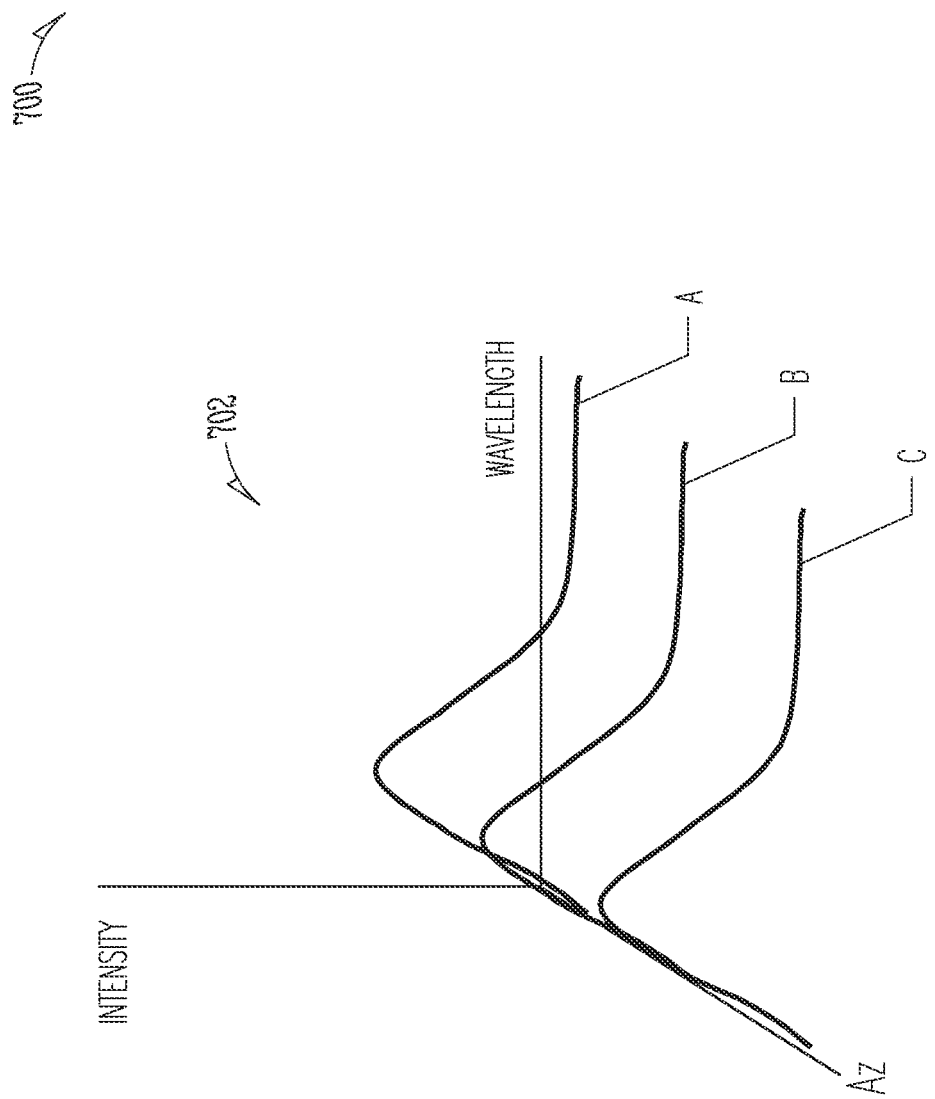

For purposes of example as shown in FIGS. 7A-7B, assume a scene 700 that is divided into angular regions A, B and C in either Az or El. For example, A could be 0-10°, B 10-20° and C 20-30°. The solar background 702 is assumed to be a simple blackbody spectrum for a uniform scene.

Figure 8A:
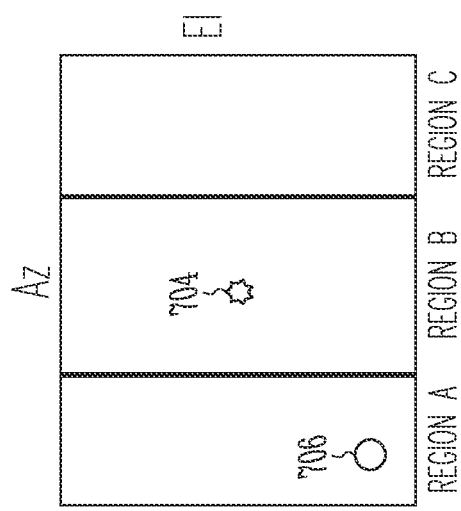
Figure 8B:
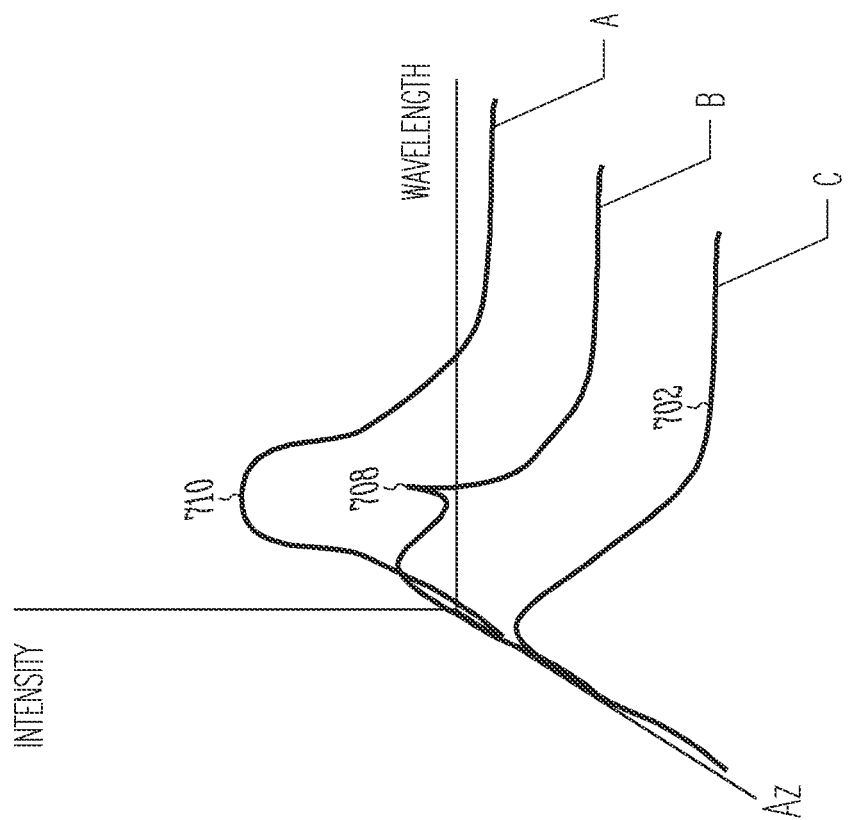

As shown in FIG. 8A, a pair of optical sources is within scene 700, a bright laser source 704 in Region B and a flashlight 706 in Region A. As shown in FIG. 8B, the laser source 704 is detected as a narrowband spike 708 above solar background 702 and the flashlight 706 is detected as a broadband distortion 710 of the solar background 702. The processor can extract the spectral information, characterize and possibly classify the optical source. The processor can also identify the angular region in Az to locate the optical source.

Figure 9A:
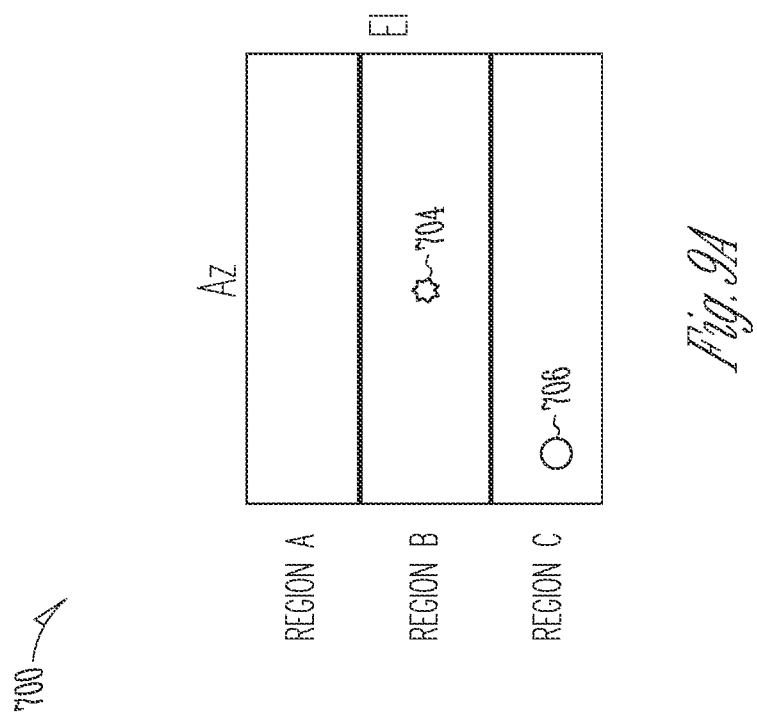
Figure 9B:
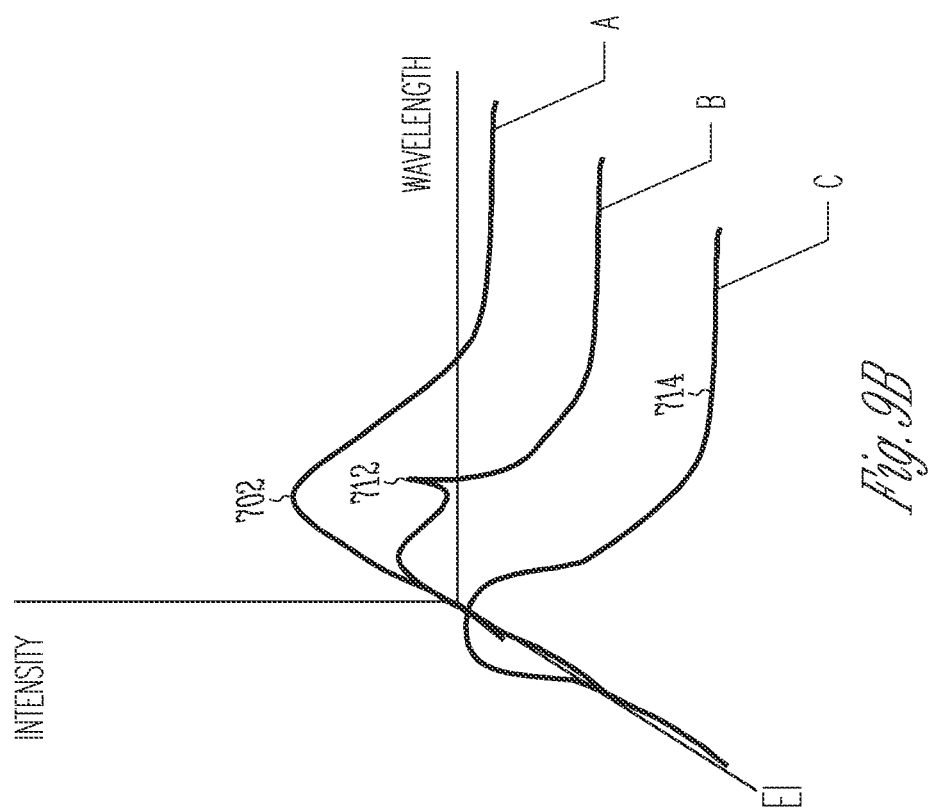

As shown in FIGS. 9A and 9B, the same scene 700 has been processed by an orthogonal channel such that the light field is now index in El and wavelength. A narrowband spike 712 corresponding to laser source 704 and a broadband distortion 714 corresponding to the flashlight both appear and are detected in the irradiance. Note, because light is now compressed in Az instead of El, the specific shapes of the narrowband spike 712 and broadband distortion 714 may vary. The processor can extract the spectral information to improve the characterization, or confidence in the characterization and classification of the optical source, and can now locate the source in both Az and El.

Figure 10A:
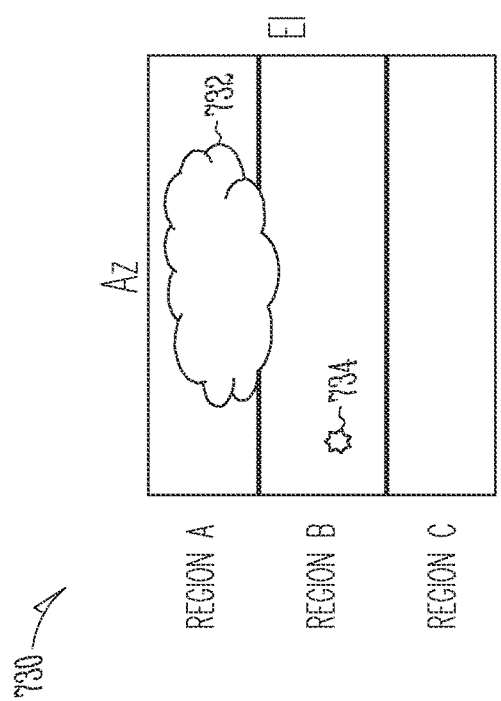
Figure 10B:
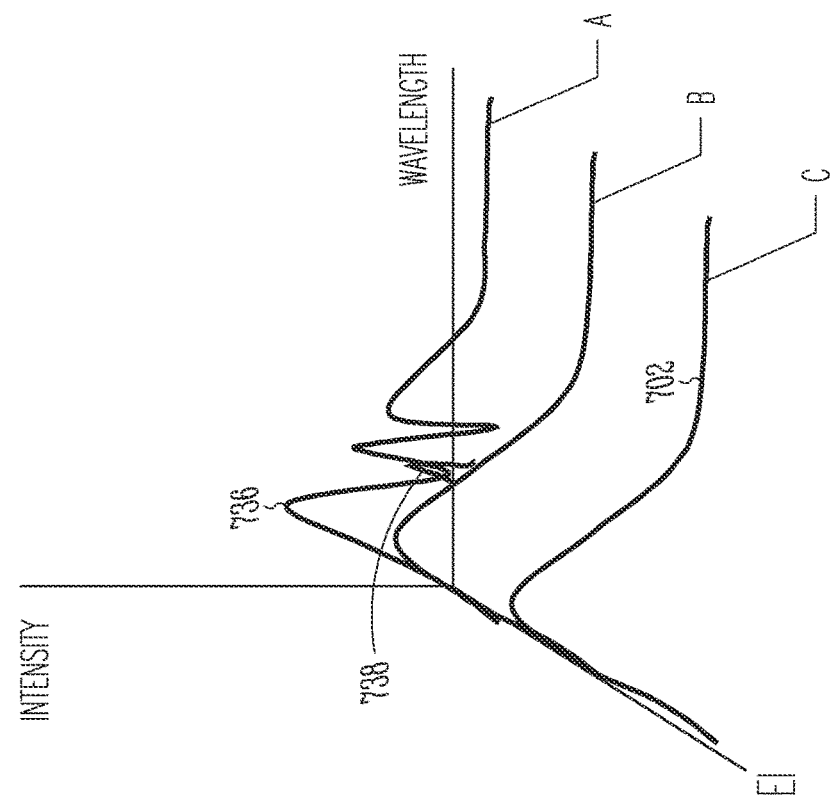

As shown in FIGS. 10A and JOB, a scene 730 includes clouds 732 in Region A and a laser source 734 in Region B. The presence of the clouds introduces absorption 736 at multiple wavelengths in solar background 702. The laser source 734 presents as a narrowband spike 738 above the solar background 702. As the clouds and laser source are in different regions of the 2-D light field, the processor can easily detect the spike and characterize and locate the optical source in El.

Figure 11A:
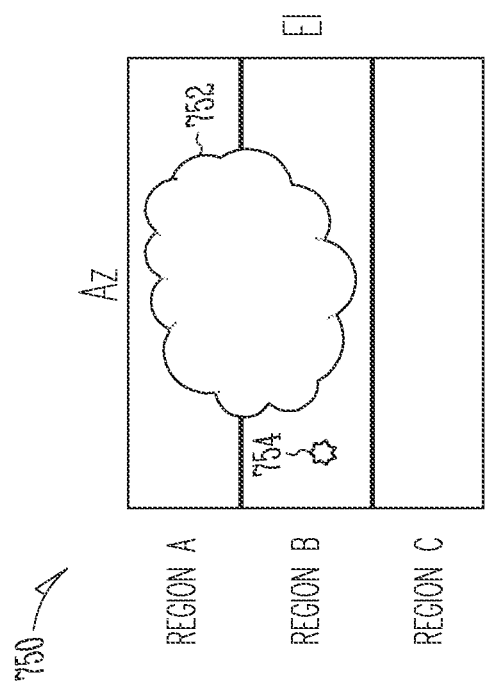
Figure 11B:
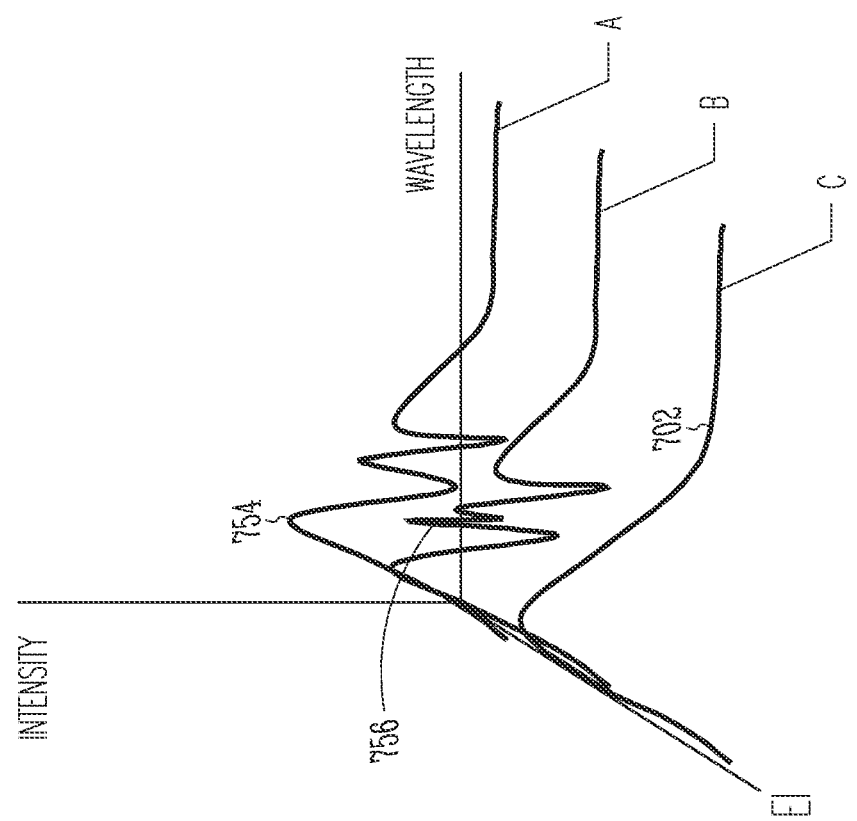

As shown in FIGS. 11A and 11B, a scene 750 includes clouds 752 in Regions A and B and a laser source 754 in Region B. The presence of the clouds introduces absorption 756 at multiple wavelengths in solar background 702. The laser source 734 presents as a narrowband spike 758 above the solar background 702. Because the clouds and laser source are in the same region of the 2-D light field, the processor has a more difficult challenge detect the spike and characterize and locate the optical source in El. If an orthogonal channel is available, the laser source 754 will reside in Region A while the clouds 752 may be all or mostly confined to Region B. The processor can fuse the spectral information from the 2 channels thereby improve detection and characterization of the laser source.

Figure 12:
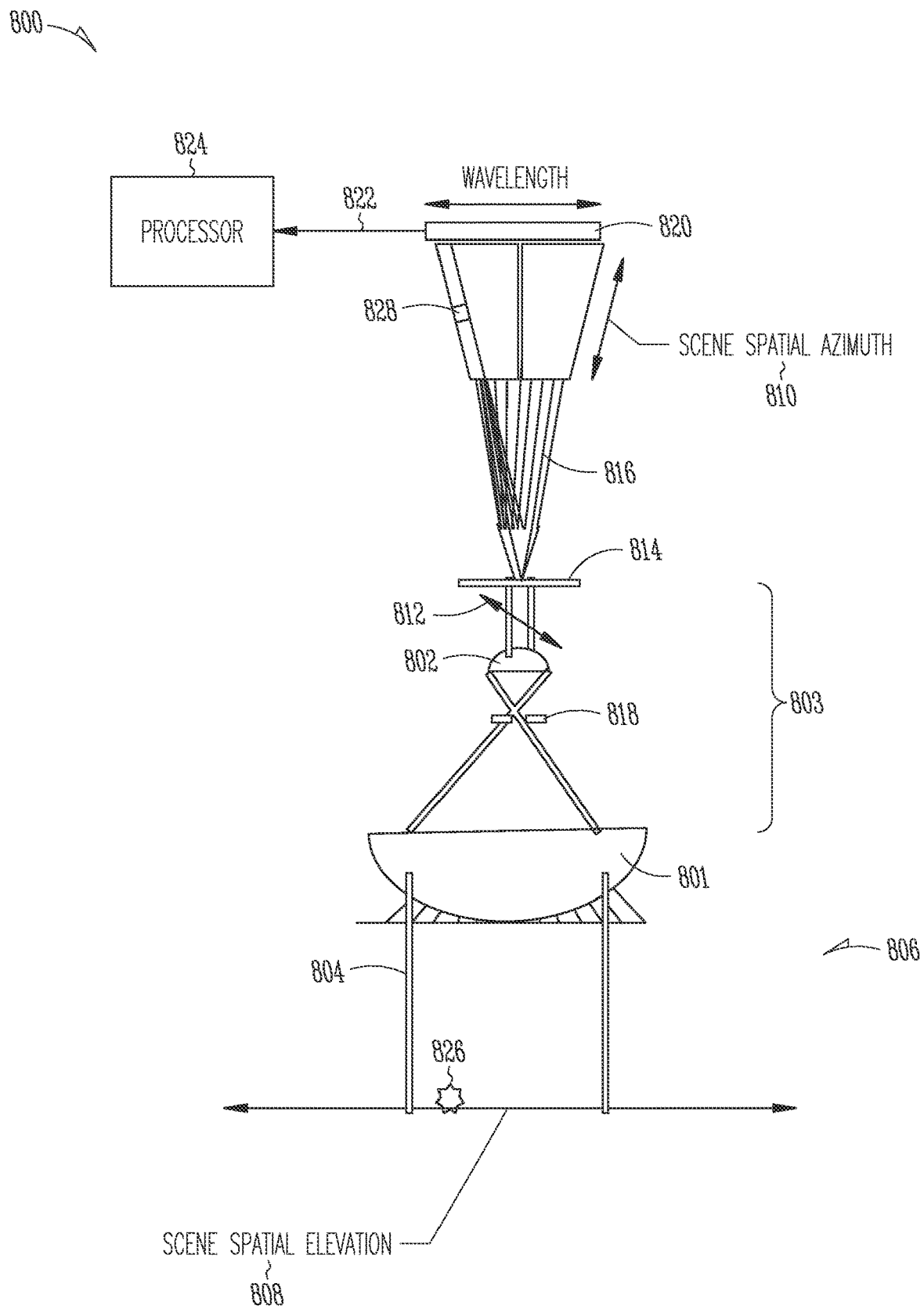
FIG. 12 is an optical block diagram of a warning system in which a matched pair of anamorphic lenses for a telescope to compress light into a single line along a second angle and a dispersive element separates the line into a plurality of wavelengths to produce a light field indexed by the second angle and wavelength.

Referring now to FIG. 12, a warning receiver 800 includes a pair of anamorphic lenses 801 and 802 spaced at their combined focal lengths to form a telescope 803 positioned to receive broad spectrum light 804 within a field-of-view (FOV) 806 defined by first and second angles 808 and 810, respectively, that are orthogonal to each other (e.g., scene spatial Elevation (El) and Azimuth (Az) and compress the light along the first angle into a single line 812 along the second angle. A dispersive element 814 is positioned after the telescope to separate the single line 812 into a plurality of wavelengths to produce a two-dimensional light field 816 indexed by the second angle and wavelength.

The system's aperture stop 818 is positioned at the intermediate image plane in between the pair of anamorphic lenses. The aperture stop 818 controls the extent of FOV 806. The aperture stop 818 may be fixed or variable. There is a trade-off between the FOV 806 and the thickness of single line 812. The wider the FOV, the thicker the line. A thinner line provides better spectral resolution. The aperture stop 818 may be used to reject off-axis rays thereby thinning the line and improving spectral resolution. The aperture stop may be formed as a separate mechanical element such as a slit.

A pixelated detector 820 (e.g. a focal plane array (FPA)) is positioned to receive the two-dimensional light field 816 and readout electrical signals 822 indexed by the second angle and wavelength. A processor 824 is coupled to the pixelated detector to process the electrical signals to detect and characterize an optical source 826 within the FOV and to locate 828 the optical source in scene spatial Az.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A warning receiver, comprising:
a first anamorphic lens positioned to receive light within a field-of-view (FOV) defined by first and second scene spatial angles that are orthogonal to each other and to compress the light along the first scene spatial angle into a single line of light along the second scene spatial angle;
a first dispersive element positioned to separate the single line of light into a plurality of wavelengths orthogonal to the second scene spatial angle to produce a two-dimensional light field indexed by the second scene spatial angle and wavelength;
a pixelated detector positioned to receive the two-dimensional light field and readout electrical signals indexed by the second scene spatial angle and wavelength; and
a processor coupled to the pixelated detector to process the electrical signals indexed by the second scene spatial angle across a wavelength spectrum of the single line of light to detect and characterize an optical source within the FOV.

2. The warning receiver of claim 1, wherein the first anamorphic lens comprises a cylindrical lens or a Powell lens.

3. The warning receiver of claim 1, wherein the first dispersive element is configured to refract light to separate the single line of light into the plurality of wavelengths.

4. The warning receiver of claim 3, wherein first dispersive element comprises a prism.

5. The warning receiver of claim 1, wherein the first dispersive element comprises a zero-order diffraction grating.

6. The warning receiver of claim 1, wherein the first dispersive element comprises an Nth-order diffraction grating where N is 1 or greater that diffracts light into a $0^{th}$ order and at least one higher order, wherein the pixelated detector is positioned to receive only the wavelengths around $0^{th}$ order of the two-dimensional light field while the at least one higher order is stray light.

7. The warning receiver of claim 1, wherein the first dispersive element comprises an engineered diffractive surface.

8. The warning receiver of claim 1, wherein the processor is configured to
estimate a solar background;
detect one or more spectral components of the optical source against the solar background; and
characterize the detected spectral components to characterize the optical source.

9. The warning receiver of claim 1, wherein the processor is configured to process the electrical signals indexed by the second scene spatial angle across the wavelength spectrum of the single line of light to locate the optical source in only the second scene spatial angle.

10. The warning receiver of claim 1, wherein the first anamorphic lens and first dispersive element are positioned on a platform that rotates about an optical axis perpendicular to the first and second angles, wherein the processor processes the electrical signals to characterize the optical source and locate the optical source in both the first and second angles.

11. The warning receiver of claim 1, wherein the first anamorphic lens and first dispersive lens occupy a first channel, a second channel oriented orthogonal to the first channel comprising:
a second anomorphic lens configured to receive light within the FOV, said second anamorphic lens positioned to compress the light along the second scene spatial angle into a second single line of light along the first scene spatial angle, wherein said first and second anamorphic lenses comprise the light along the first and second scene spatial angles by an equal amount; and
a second dispersive element positioned to separate the second single line of light into a plurality of wavelengths orthogonal to the first scene spatial angle to produce a two-dimensional light field indexed by the first scene spatial angle and wavelength.

12. The warning receiver of claim 1, wherein an aperture stop and the first dispersive element are positioned at or near a focal point of the first anamorphic lens.

13. The warning receiver of claim 1, further comprising a second anamorphic lens spaced from the first anamorphic lens at a sum of the focal lengths of the first and second anamorphic lenses to form a telescope, and an aperture stop positioned between the first and second anamorphic lenses.

14. The warning receiver of claim 1, further comprising:
a mechanical element that selectively moves a plurality of dispersive elements in and out of the optical path to vary the separation of the single line of light into the plurality of wavelengths.

15. The warning receiver of claim 1, further comprising:
a variable aperture stop configure to vary the FOV.

16. A method of detecting and characterizing an optical source, the method comprising:
receiving light within a field-of-view (FOV) defined by first and second scene spatial angles that are orthogonal to each other;

compressing the light along the first scene spatial angle into a single line of light along the second scene spatial angle;

separating the single line of light into a plurality of wavelengths orthogonal to the second scene spatial angle to produce a two-dimensional light field indexed by the second scene spatial angle and wavelength;

detecting the two-dimensional light field to generate electrical signals indexed by the second scene spatial angle and wavelength; and processing the electrical signals to detect and characterize the optical source within the FOV.

17. The method of claim 16, further comprising:
estimating a solar background; and
processing the electrical signals to detect one or more spectral components of the optical source against the solar background and characterize the detected spectral components to characterize the optical source.

18. The method of claim 16, wherein the light is compressed along the first scene spatial angle into the single line of light by passing the light through an anamorphic lens.

19. The method of claim 16, wherein the light is separated into a plurality of wavelengths by passing the light through one of a prism, a engineered diffractive surface, a $0^{th}$-order diffraction grating or an $N^{th}$-order diffraction grating where N is 1 or more.

20. The method of claim 16, further comprising rotating the compression of the light into the single line of light and separation of the single line into the plurality of wavelengths to rotate the two-dimensional light field about an optical axis perpendicular to the first and second scene spatial angles, wherein processing the electrical signals further comprises locating the optical source in both the first and second scene spatial angles.

21. The warning receiver of claim 11, wherein the processor is configured to process the electrical signals indexed by the first and second scene spatial angles to independently locate the optical source in the first and second scene spatial angles.

22. The method of claim 16, further comprising:
processing the electrical signals to locate the optical source in only the second scene spatial angle.

23. A warning receiver, comprising:
first and second anamorphic lenses positioned in orthogonally oriented channels to receive light within a field-of-view (FOV) defined by Elevation and Azimuth angles that are orthogonal to each other, said first anamorphic lens configured to compress the light along the Elevation angle into a first single line of light along the Azimuth angle, said second anamorphic lens configured to compress light along the Azimuth angle into a second single line of light along the Elevation angle;

first and second dispersive elements positioned in the orthogonally oriented channels to separate the first and second single lines of light into a plurality of wavelengths orthogonal to the Azimuth and Elevation angles, respectively, to produce a first and second two-dimensional light fields indexed by the Azimuth and Elevation angles and wavelength;

at least one pixelated detector positioned to receive the first and second two-dimensional light field and first and second readout electrical signals indexed by the Azimuth and Elevation angles and wavelength; and a processor coupled to the at least one pixelated detector to process the electrical signals indexed by the Azimuth and Elevation angles across the wavelength spectrum a wavelength spectrum of the first and second single lines of light, respectively, to detect and characterize an optical source within the FOV and to independently locate the optical source in the Azimuth and Elevation angles.

* * * * *

UNITED STATES PATENT AND TRADEMARK OFFICE
CERTIFICATE OF CORRECTION

PATENT NO. : 11,747,445 B2
APPLICATION NO. : 17/411859
DATED : September 5, 2023
INVENTOR(S) : Keller et al.

It is certified that error appears in the above-identified patent and that said Letters Patent is hereby corrected as shown below:

In the Specification

In Column 2, Line 61, delete "at at" and insert --at-- therefor

In Column 3, Line 29, delete "0th-order" and insert --$0^{th}$-order-- therefor

In Column 3, Line 30, delete "detected:" and insert --detected;-- therefor

In Column 3, Line 38, delete "source:" and insert --source;-- therefor

In Column 6, Line 42, delete "JOB," and insert --10B,-- therefor

In the Claims

In Column 8, Line 12, in Claim 8, after "to", insert --:--

In Column 8, Line 35, in Claim 11, delete "anomorphic" and insert --anamorphic-- therefor In Column 8, Line 59, in Claim 14, delete "the" and insert --a-- therefor In Column 9, Line 29, in Claim 20, delete "the" and insert --a-- therefor In Column 10, Line 30, in Claim 23, after "across", delete "the wavelength spectrum"

Signed and Sealed this
Twenty-ninth Day of October, 2024

Katherine Kelly Vidal
*Director of the United States Patent and Trademark Office*